(12) United States Patent
Wei et al.

(10) Patent No.: US 10,067,785 B1
(45) Date of Patent: Sep. 4, 2018

(54) EVENT DRIVEN VIRTUAL MACHINE INSTANCE POOL BALANCING

(71) Applicant: AMAZON TECHNOLOGIES, INC., Seattle, WA (US)

(72) Inventors: Eric Paul Wei, Seattle, WA (US); James Stanford Gilmore, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 105 days.

(21) Appl. No.: 15/197,140

(22) Filed: Jun. 29, 2016

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 6,463,454 B1* | 10/2002 | Lumelsky | ............. | G06F 9/5083 707/E17.12 |
| 6,466,980 B1* | 10/2002 | Lumelsky | ............. | G06F 9/5055 707/999.2 |
| 8,560,671 B1* | 10/2013 | Yahalom | ............. | H04L 67/1097 709/224 |
| 2007/0220513 A1* | 9/2007 | Hwang | ................... | G06F 9/524 718/1 |
| 2008/0172673 A1* | 7/2008 | Naik | ....................... | G06F 9/505 718/104 |
| 2008/0271039 A1* | 10/2008 | Rolia | ..................... | G06Q 10/06 718/105 |
| 2011/0022870 A1* | 1/2011 | McGrane | .............. | G06F 1/3203 713/340 |
| 2011/0061057 A1* | 3/2011 | Harris | ................... | G06F 9/5072 718/104 |
| 2012/0180039 A1* | 7/2012 | Bravery | .................... | G06F 8/60 717/178 |
| 2012/0284408 A1* | 11/2012 | Dutta | .................... | G06F 9/5066 709/226 |
| 2012/0303923 A1* | 11/2012 | Behera | .................. | G06F 9/5077 711/170 |
| 2013/0268940 A1* | 10/2013 | Gmach | ................. | G06F 9/5077 718/104 |
| 2014/0280956 A1* | 9/2014 | Shu | ...................... | H04L 67/1004 709/226 |
| 2016/0164911 A1* | 6/2016 | Karasaridis | ......... | H04L 63/1458 726/23 |
| 2016/0357610 A1* | 12/2016 | Bartfai-Walcott | .... | G06F 9/5027 |
| 2017/0075709 A1* | 3/2017 | Feng | .................... | G06F 9/45558 |

* cited by examiner

Primary Examiner — Adam Lee
(74) Attorney, Agent, or Firm — Blank Rome LLP

(57) ABSTRACT

A system includes one or more computer systems that include one or more processors and memory. The memory includes instructions, that, upon being executed by the one or more processors, cause the system to determine a plurality of increased capacity configuration options for a first pool of servers, generate an assessment value for each of the plurality of increased capacity configuration options, and implement a first configuration option of the plurality of increase capacity configuration options having a greatest health increase assessment value.

13 Claims, 11 Drawing Sheets

EVENT DRIVEN VIRTUAL MACHINE INSTANCE POOL BALANCING

BACKGROUND

Many companies and organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers have increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct systemal computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. In many cases, the functionality and usability of applications that run on such platforms may rely extensively on network communications with other parts of the provider network, and/or with external entities such as customers or other third parties.

BRIEF DESCRIPTION OF THE DRAWINGS

For a detailed description of various examples, reference will now be made to the accompanying drawings in which.

DETAILED DESCRIPTION

Figure 1:
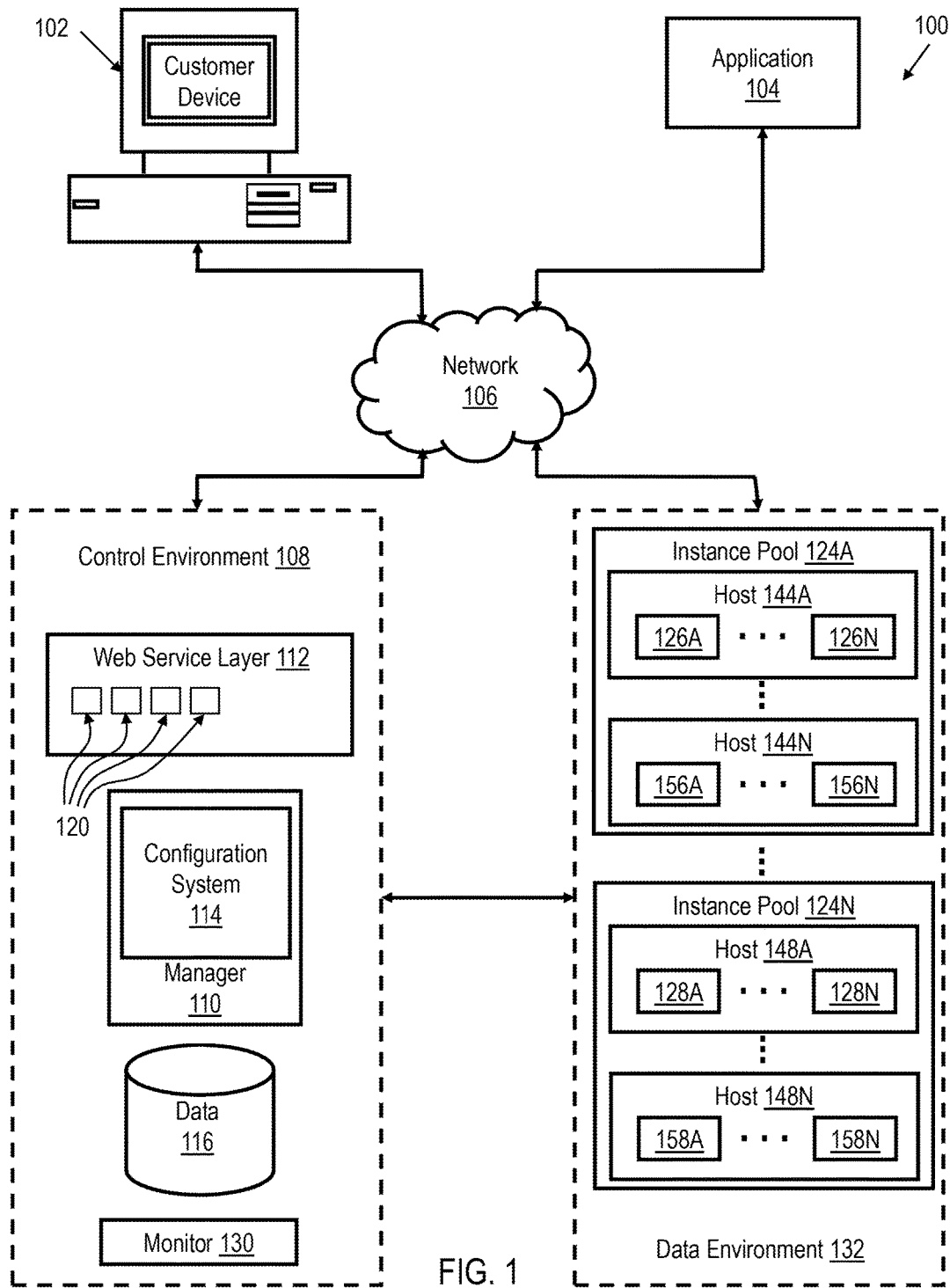
FIG. 1 shows a block diagram of a distributed computing environment for acquiring capacity for a pool of virtual machine instances of the distributed computing environment, in accordance with various embodiments.

In large-scale distributed systems operated by service providers, virtual machine instances may run on physical hosts within pools of virtual machines. These pools of virtual machines may include virtual machines that have the same compute power, memory, storage, networking capability (e.g., supports classic network addressing or a virtual private cloud addressing), and tenancy capabilities (i.e., whether multiple customers may run virtual machines from a single physical host or whether only a single customer may run a virtual machine from a single host). However, in a conventional system, whenever capacity is needed to be added to a pool of virtual machine instances, an operator manually decides what actions to take to add the needed capacity without the aid of knowing how those actions will affect the remainder of the system. Therefore, it is desirable to develop a system and method that automatically takes actions to add capacity to a pool of virtual machine instances when capacity is needed taking into account how those actions effect the remainder of the system.

Various embodiments of methods and apparatus for configuring hardware to acquire capacity for a pool of virtual machine instances as implemented by various network devices in a large-scale distributed system are described. In some embodiments, a health index value is generated that indicates the "health" of a pool of virtual machine instances. The health index value is generated based on a comparison of forecast demand data for the pool of virtual machine instances that may estimate how many virtual machine instances will be needed at a future time in a given virtual machine pool and forecast capacity data that includes an indication of the number of slots (e.g., the space used to host a virtual machine on a server) estimated to be available to run virtual machines on hosts in the pool at the future time. Additionally, the system may receive and/or determine configuration options that are available to the system. These configuration options, if implemented, are designed to increase the capacity available to the pool of instances. However, because implementing any configuration option may affect other aspects of the overall system, an assessment value is generated that assess how the health of the entire system and/or other business considerations would be affected should each configuration option be implemented. If the health index value for the pool of virtual machine instances is below and/or less than a threshold value, the configuration option with the lowest assessment value is implemented (i.e., the configuration option that maintains the health of the system and/or balances the various pools of virtual machines). Thus, capacity may be increased for one pool of virtual machine instances while the health of the other parts of the system is maintained.

In much of the following description, a provider (e.g., a company, organization, etc.) may operate a provider network, which is used as an example of a distributed system in which the centralized networking configuration techniques may be implemented. Such networks set up by the service provider to provide one or more network-accessible services (such as various types of cloud-based database, computing or storage services) accessible via the Internet and/or other networks to a distributed set of clients may be termed "provider networks" herein. At least some of the services may be packaged for client use in service units called "instances": for example, a virtual machine instantiated by a virtualized computing service may represent a "compute instance," and a storage device such as a block-level volume instantiated by a storage service may be referred to as a "storage instance." In some embodiments, instances of higher-level services may be packaged using compute instances and/or storage instances—e.g., a database instance may be built using a combination of compute and storage instances in some embodiments. Computing devices such as servers and/or storage devices at which such units of various network-accessible services of a provider network are implemented may be referred to herein as "instance hosts" or more simply as "hosts." In the remainder of this document, the term "customer devices," when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network. The term "client," when used as the source or destination of a given communication, may refer to a virtual machine instance attached user. For example, a user may make a request on a client which then may communicate with other aspects of the provider network to complete the request.

A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments. Clients may interact with resources and services at the provider network from devices located at client-owned or client-managed premises or data centers external to the provider network, and/or from devices within the provider network. In at least some embodiments, a virtualized computing service offering various types of compute instances may be implemented within the provider network, and such compute instances may be allocated to clients. Other services of the provider network may be accessed from such compute instances as well as from external locations. It is noted that although provider networks serve as one example context in which many of the validation techniques described herein may be implemented, those techniques may also be applied to other types of distributed systems than provider networks, e.g., to large-scale distributed application environments in which different components of the applications may have time-varying bandwidth needs.

FIG. 1 shows a block diagram of an environment 100 for acquiring capacity for a pool of virtual machine instances, such as virtual machine instance pools 124A-N, in accordance with various embodiments. Systems and methods in accordance with one embodiment provide at least one resource access gateway, or control environment, either as part of the data environment or in a path between the user and the data environment, in some embodiments via a distribution environment, that enables users and applications to access shared and/or dedicated resources, while allowing customers, administrators, or other authorized users to allocate resources to various users, clients, or applications and ensure adherence to those allocations. Such functionality enables a user to perform tasks such as storing, processing, and querying relational data sets in a provider network without worry about latency degradation or other such issues due to other users sharing the resource. Such functionality also enables guest users to obtain access to resources to perform any appropriate functionality, such as to render and/or serve streaming media or perform any of a number of other such operations. While this example is discussed with respect to the Internet, Web services, and Internet-based technology, it should be understood that aspects of the various embodiments can be used with any appropriate resources or services available or offered over a network in an electronic environment. Further, while various examples are presented with respect to shared access to disk, data storage, hosts, and peripheral devices, it should be understood that any appropriate resource can be used within the scope of the various embodiments for any appropriate purpose, and any appropriate parameter can be monitored and used to adjust access or usage of such a resource by any or all of the respective users.

A resource gateway or control environment 108 can be used in some environments to provide and/or manage access to, and the hardware configuration of, various resources, such as virtual machine instances 126A-N, 156A-N, 128A-N, and/or 158A-N, in the data environment 132. In a distributed computing environment, to the control environment 108 can include a manager 110 or similar system that manages access to, and the hardware configuration of, the various resources in the provider network. Additionally, the application programming interfaces (APIs) 120 allow a user, through customer device 102, to make requests for access to various resources, including instances 126A-N, 156A-N, 128A-N, and/or 158A-N. Once access is established, a resource is allocated, an instance launched, etc., a user can communicate directly with the resource to perform certain tasks relating to that resource, such as data storage or processing. The user, in some embodiments, can use direct interfaces or APIs to communicate with data instances, hosts, or other resources once access is established, but uses the control environment component(s) to provision the resource, for example.

In this example, a computing device, customer device 102, for an end user is shown to be able to make calls through a network 106 to a control environment 108 (or other such access layer) to perform a task such as to launch a specific instance. While an end user computing device and application are used for purposes of explanation, it should be understood that any appropriate user, application, service, device, component, or resource can access the interface(s) and components of the connection component and data environment as appropriate in the various embodiments. Further, while certain components are grouped into a data, control, and distribution "environment," it should be understood that this can refer to an actual or virtual separation of at least some resources (e.g., hardware and/or software) used to provide the respective functionality. Further, the control environment 108 can be considered to be part of the data environment 132 and/or distribution environment in certain embodiments. While a single control environment is shown in this embodiment, there can be multiple instances of control or access management components or services in other embodiments. A control environment can include any appropriate combination of hardware and/or software, such as at least one server configured with computer-executable instructions.

The control environment also can include a set of APIs 120 (or other such interfaces) for receiving Web services calls or other such requests from across the network 106, which a Web services layer 112 can parse or otherwise analyze to determine the steps or actions needed to act on or process the call. For example, a Web service call might be received that includes a request to launch or terminate a specific instance 126A-N, 156A-N, 128A-N, or 158A-N. In this example, the Web services layer can parse the request to determine the type of connection or access needed, the appropriate type(s) of resources needed, or other such aspects.

The control environment can include one or more resource allocation managers 110, each responsible for tasks such as validating the user or customer associated with the service request, obtaining or allocating access to the appropriate resource(s) in order to execute the request (e.g., launching a requested instance), and managing the network hardware to host the various resources (e.g., increasing hardware capacity to run the various instances). Such a system can handle various types of requests and establish various types of connections. Such a system also can handle requests for various types of resources, such as specific graphic processors or other types of hardware or hardware functionality, and can provide access to the appropriate resource(s). Components of the data environment 132, or the resource layer of the service provider environment, may perform the necessary tasks to allocate virtual machine instances residing on the data environment 132 in response to customer requests. For allocation of an instance, for example, the manager 110 can be configured to provision an instance (e.g., a virtual machine) by selecting a host to run the instance, sending a command to a server manager (e.g., virtualization system such as a hypervisor), to launch the instance, and any other set-up operations, such as allocating a volume of off-instance persistent storage, attaching the persistent storage volume to the instance, and allocating and attaching a public IP address, network interface, or other address, port, interface, or identifier for the instance. Manager 110 may store state reflective of each launch in data store 116. For tasks such as obtaining processing of an instruction using a particular type of hardware, for example, the components of the data environment 132, in conjunction with the control environment 108, can perform actions such as provisioning a device for a user and providing shared and/or dedicated access to the resource for a period of time at a particular level of access to the resource. It should be understood that the data store 116 can be a separate data store or a portion of another data store.

In various embodiments, as discussed, the data environment 132 takes the form of (or at least includes or is part of) a service provider environment, or a set of Web services and resources that provides data storage and access across a network of hardware and/or software components. Thus, the data environment 132 may include a plurality of host servers 144A-N and 148A-N that are arranged to execute instances of an application in a specific instance pool. For example, host 144A may be configured to execute instances 126A-N in instance pool 124A, host 144N may be configured to execute instances 156A-N in instance pool 124A, host 148A may be configured to execute instances 128A-N in instance pool 124N, and host 148N may be configured to execute instances 158A-N in instance pool 124N. A service request received from a customer device 102 or application 104 to launch an instance, for example, may be directed to and distributed to a host, to launch in one of instance pools 124A-N in order to execute the request. Each of the instance pools 124A-N contain hosts, which include slots that can host instances (i.e., hosts 144A-N for instance pool 124A and hosts 148A-N for instance pool 124N). For example, instances 126A-N may launch and/or run from instance pool 124A running on host 144A while instances 128A-N may launch and/or run from instance pool 124N running on host 148A. The instances 126A-N, 156A-N, 128A-N, and 158A-N may be reserved instances which include resource instances that may be reserved by a customer for fairly long periods of time, such as one-year terms, three-year terms, etc. by paying a low, one-time, upfront payment for the resource instance, and then paying a low hourly rate for actual use of the instance at any desired times during the term of the reservation. Instances 126A-N, 156A-N, 128A-N, and 158A-N may also be spot instances which include resource instances that are purchased for a guaranteed maximum price that the customer specifies (a bid price). If the bid price equals or exceeds the current spot price for a desired instance, the instance is activated and assigned for exclusive use by the customer. However, if the spot price exceeds or rises to exceed the bid price, the spot instance is evicted (i.e., terminated).

In some embodiments, each of the instances of a particular instance pool, such as instance pools 124A-N, is related to one another (e.g., instances of instance pool 124A may be of the same type). For example, the hosts in instance pool 124A may be configured to launch and run memory optimized instances and the hosts in instance pool 124N may be configured to launch and run compute optimized instances. Because each of the instances of a particular instance pool may be related to one another, each of the hosts 144A-N and 148A-N are configured to host (i.e., run) related instances. For example, host 144A may be configured to host instances 126A-N, but not instances 128A-N, assuming that instances 126A-N are not of the same type as instances 128A-N. In order for host 144A to host instances 128A-N, host 144A may be reconfigured to host instances 128A-N, but then host 144A may not be configured to host instances 126A-N. In some embodiments, the reconfiguring a host to support a different instance type, which means changing the host from one pool to another, may include determining that the host that is being reconfigured includes the necessary hardware in the server (e.g., certain CPU models) to support the instance type associated with the new pool, that the host has enough memory to support the new instance type associated with the new pool, that the host has enough network capacity to support the new instance type, etc.

In some embodiments, there are a finite number of slots available in each instance pool 124A-N (e.g., host 144A, which is hosting instances 126A-N in instance pool 124A, may include slots to launch and run 50 instances and host 144N, which is hosting instances 156A-N also in instance pool 124A, may include slots to launch and run 50 instances). Thus, in this example, instance pool 124A has the capacity to launch and run 100 instances. In other words, the hardware hosts 144A-N and 148A-N may have capacity to run a finite number of instances. Therefore, the number of available slots for any given instance pool 124A-N may begin to shrink and eventually reach zero if instances are launched at a rate higher than they are terminated. If there are zero slots available (i.e., there is insufficient hardware capacity to run the requested instances) in a given instance pool, no new instances may be launched in that pool. Therefore, monitor 130 may be configured to monitor the "health" of the instance pools 124A-N. In some embodiments, monitor 130 may be configured to monitor and/or receive from another system forecast demand for each of the instance pools 124A-N t. Thus, the monitor 130 may forecast how much capacity will be needed for each instance pool in the future (i.e., forecast customer demand) and/or receive this forecast demand data for each of the instance pools 124A-N. In an example embodiment, the data used to build the forecast can be obtained from the hosts. For example, manager 110 may initiate a command instruction to launch an instance, as described above, and store state reflective of the launch in data store 116. Similarly, manager 110 may terminate an instance by initiating a command instruction to terminate the instance and store state reflective of the termination in data store 116. Monitor 130 may query the state reflective of launches and terminations stored in data store 116 to forecast future capacity requirements for a given instance pool, in some embodiments, based at least in part on past demand. The forecast demand data may include estimates for how much hardware capacity is needed at a given time in a given instance pool. In other words, forecast demand data includes estimates of the number of instances needed at a future time in a pool of servers (i.e., hosts) configured to host instances in an instance pool. The forecast demand data may be generated based on historical data (e.g., the number of instances launched and running in a given instance pool in the past) and/or booked reservations (e.g., the number of instances customers have reserved for future use). In an example, the forecast demand data may indicate that in 1 hour, 90 slots are needed to run 90 instances in instance pool 124A. In other words, the forecast demand data may indicate the number of instances that are expected to be launched and/or running within a particular instance pool at a particular point in time due to forecasted customer demand. Thus, the forecast demand data may indicate the number of instances expected to be launched and/or running within a particular instance pool at a particular point in time due to forecasted customer demand. Thus, the forecast demand data may indicate the number of empty slots expected to be available in the instance pool at the point in time. The forecast demand data may be generated by the monitor 130 utilizing any forecasting method including extrapolation, reference class forecasting, casual models, rule-based forecasting, exponential smoothing models, hybrid models, etc. In another embodiment, a simplistic approach can be to track historical demand and capacity for each instance pool over a time period (e.g., 1 month, 1 year, etc.) and add X % each month going forward (where X is an integer greater than 1). In another embodiment, the service provider can use qualitative, time series or causal forecasting methods. For example, the forecast demand data may be based on the average, median, highest, and/or lowest number of instances running in the instance pool for a Wednesday at 01:00 a.m. over the past year to provide a forecast of demand for a future Wednesday at 01:00 a.m. The forecast demand data may be generated for any point of time in the future (e.g., next Wednesday at 01:00 a.m., next month, next year, etc.) Furthermore, in some embodiments, the forecast demand data may be determined and/or generated in another system and by any forecasting method and transmitted to monitor 130.

Additionally, monitor 130 may also forecast actual hardware capacity to host instances in an instance pool at a time in the future. In other words, monitor 130 may forecast capacity data that includes an indication of a number of slots estimated to be available to run instances in a pool of servers (i.e., hosts) at the future time. For example, monitor 130 may monitor each of the instance pools 124A-N to determine the number of hosts hosting instances and total available slots for those hosts in each of the instance pools. Thus, monitor 130 may determine that instance pool 124A has 10 hosts configured to host instances in the pool. Additionally, monitor 130 may determine that those 10 hosts have 100 total available slots to host instances in the pool. Therefore, the current capacity for instance pool 124A is 100 slots. The monitor 130 may generate the forecast capacity data by adding racks of hosts that are scheduled to be added to host instances in instance pool 124A to the current capacity data and subtract hosts that are scheduled to be removed and/or reconfigured from hosting instances in instance pool 124A. For example, if a rack of servers, containing 10 servers with 100 slots total, is scheduled to be added to host instances in instance pool 124A on next Tuesday and no servers are scheduled to be removed from hosting instances in instance pool 124A, then the forecast capacity data for next Wednesday at 01:00 a.m. will provide a forecast of 200 slots available to host instances in instance pool 124A. Similar to the forecast demand data, the forecast capacity data may be generated for any point of time in the future (e.g., next Wednesday at 01:00 a.m., next month, next year, etc.). Furthermore, the forecast capacity data may change as plans to add and/or subtract racks and/or other hosts from hosting instances in an instance pool change. For example, if the current capacity data indicates that 100 slots are available to host instances in instance pool 124A and 100 slots are scheduled to be added to host instances in instance pool 124A, then the forecast capacity data will indicate that 200 slots will be available to host instances in instance pool 124A. However, if the schedule changes and only 50 slots are scheduled to be added to host instances in instance pool 124A, then the forecast capacity data will change as well to indicate that 150 slots will be available to host instances in instance pool 124A. Additionally, in some embodiments, the forecast capacity data may be determined and/or generated in another system and by any forecasting method and transmitted to monitor 130.

Monitor 130 may be configured to compare the forecast capacity data with the forecast demand data and generate a pool health index value based on the comparison. For example, monitor 130 may determine and/or receive forecast demand data that estimates that instance pool 124A will need 90 slots available to launch and/or host instances 126A-N and 156A-N on Wednesday at 01:00 a.m. Monitor 130 may also that 100 slots will be available to host instances on next Wednesday at 01:00 a.m. Thus, in this example, there are 10 more slots available to host instances than are forecasted to be needed. Therefore, the monitor 130 may determine that instance pool 124A is relatively healthy (i.e., more capacity is available than forecasted to be needed) and generate and/or assign instance pool 124A a relatively high pool health index value. As either the forecast demand data or the forecast capacity data changes, so might the health index value. For example, if the schedule to add hosts to host instances in instance pool 124A changes from being scheduled to add 100 slots to being scheduled to add 50 slots to host instances in the instance pool, the health index value for instance pool 124A may decrease because there will be less available slots to meet the forecast demand for instance pool 124A. Conversely, if the schedule to add hosts to host instances in instance pool 124A changes from being scheduled to add 100 slots to being scheduled to add 150 slots to host instances in the instance pool, the health index value for instance pool 124 may increase because there will be more available slots to meet the forecast demand for instance pool 124A. In this way, the health index value may provide an indication whether forecast changes to the hardware configuration of the instance pools 124A-N increase or decrease the overall health of the system.

The pool health index value may be any number and/or indication of the health, in terms of forecast capacity versus forecast demand, of an instance pool. For example, the pool health index value may be a range of numbers from 1-10 with 1 indicating that the instance pool is very unhealthy and 10 indicating that the instance pool is very healthy. In another example, the health index value may be a color coded index including any number of colors, such as red, orange, yellow, blue, and green with red indicating that the instance pool is very unhealthy and green indicating that the instance pool is very healthy.

System configuration system 114 may be hardware and/or software that determines increased capacity configuration options for the instance pools 124A-N. The increased capacity configuration options include hardware configuration options to increase the capacity for a given instance pool (e.g., to add additional slots to run instances in a given instance pool). For example, the increased capacity configuration options for instance pool 124A may include reconfiguring host 148A to host instances of the same type as instances 126A-N, launching additional hardware to host instances in instance pool 124A (e.g., adding servers configured to host instances in instance pool 124A), evicting spot instances from instance pool 124A, evicting fraudulently initiated instances from the instance pool 124A, doing nothing, etc. In some embodiments, reconfiguring host 148A to host instances of the same type as instances 126A-N may include migrating instances already running in slots on host 148A to a different slot on a different host (e.g., on host 148N) to free up the former slot so that host 148A may be reconfigured. In some embodiments, the list of increased capacity configuration options may be predetermined for each instance pool 124A-N.

The configuration system 114 may also generate an assessment value for each of the increased capacity configuration options for the instance pool at any given period of time. Thus, configuration system 114 may generate an assessment value for each of the increased capacity configuration options in response to the pool health index value received from monitor 130 for a given instance pool dropping below and/or being less than a threshold value. For example, if the pool health index value for instance pool 124A is less than a threshold value, configuration system 114 may generate the assessment value for each of the increased capacity configuration options listed for instance pool 124A. The assessment value generated may be based on health of the system, such as the amount of time required to implement a particular increased capacity configuration option, the health index value of the of the instance pool for which capacity may be added (e.g., the lower the health index value the lower the overall system health if nothing is done, while the higher the health index value the higher the overall system health even if nothing is done), and the health index value of the particular configuration option (e.g., if the configuration option is reconfiguring host 148A to host instances of the same type as instances 126A-N, the health index value of the instance pool 124N), and business requirements, such as profit (e.g., if the spot instance price is very high, evicting a spot instance may reduce profit) and other business requirements (e.g., if additional hardware hosts may be launched but are scheduled to be retired, the business is affected if these additional hardware hosts are launched), etc. The assessment value may be any number and/or indication of the health to the system and/or other business requirements if a configuration option is implemented. For example, the assessment value may be a range of numbers from 1-10 with 1 indicating that the health for the overall system in implementing the configuration option would increase a large amount and 10 indicating that the health of the overall system if the configuration option is implemented would not increase very much and/or decrease. While in this example, an assessment value of 1 indicates a large increase in health to the overall system, in other examples, a high number, such as 10, may indicate a large increase in health to the overall system if the configuration option is implemented while a low number, such as 1, may indicate a small increase and/or decrease in overall health to the system if the configuration option is implemented. In another example, the assessment value may be a band of overall system health if a configuration option is implemented, such as low, medium, and high.

In some embodiments, the assessment value may be generated to balance the health index values of different instance pools. For example, instance pool 124A may have a health index value of 2 and instance pool 124N may have a health index value of 8. In this example, the health index values of instance pools 124A and 124N are very different and not balanced. Thus, the assessment value of reconfiguring host 148A from running instances in instance pool 124N to run instances of the same type as instances 126A-N would indicate a large increase for the health to the overall system (e.g., a low assessment value) because implementing this option would tend to balance the health index value of the two instance pools. However, if the instance pool 124A has a health index value of 5 and instance pool 124N has a health index value of 5, then the assessment value of reconfiguring host 148A from running instances in instance pool 124N to run instances of the same type as instances 126A-N would indicate a small increase for the health to the overall system (e.g., a high assessment value) because implementing this option would tend to lessen the balance of the health index value of the two instance pools. Thus, the assessment value of some configuration options may be generated such that the instance pools end up having balanced health index values.

The configuration system 114 may compare each of the assessment values that were generated and determine a greatest health increase configuration option (i.e., the option which would increase the overall health of the system the greatest if implemented). For example, if the list of increased capacity configuration options includes five options (e.g., reconfiguring host 148A, reconfiguring another host, launching a new host, evicting a spot instance, and doing nothing), then the configuration system 114 compares the assessment values generated for each of the five options and determines the option with the greatest health increase assessment value (e.g., the lowest assessment value). In response to the pool health index value of the instance pool for which capacity may be added (e.g., instance pool 124A) dropping below and/or being less than a threshold value, the configuration system 114 may implement the greatest health increase configuration option. For example, if the threshold value for the health index value of instance pool 124A is 3, and the monitor 130 determines and transmits to configuration system 114 a health index value of 2 for instance pool 124A, the configuration system 114 may implement the greatest health increase configuration option (i.e., the increased capacity configuration option with the lowest assessment value).

In some embodiments, the process of increasing capacity by determining and implementing a greatest health increase configuration option from a list of increased capacity configuration options is iterative. For example, after implementing the greatest health increase configuration option, the health index value for the instance pool that received the additional capacity (e.g., instance pool 124A) may be determined by monitor 130. In some cases, even after implementing the greatest health increase configuration option, the health index value for the instance pool that received the additional capacity may remain below the threshold value. In other words, the implementation of the lowest configuration option may not increase capacity enough to increase the health index value of the instance pool above the threshold value. Thus, the configuration system 114 may determine the second greatest health increase configuration option (i.e., the increased capacity configuration option with the lowest assessment value excluding the greatest health increase configuration option already implemented). For example, if the configuration system 114 determines that option 1 has an assessment value of 1, option 2 has an assessment value of 5, and option 3 has an assessment value of 8, then option 1 is the greatest health increase configuration option and may be implemented. If, however, the implementation of option 1 does not create the required capacity, option 2 may be implemented as the second greatest health increase configuration option.

In this way, the environment 100 reacts quickly to evaluate possible actions that may satisfy customer demand based on overall health of the system. In fact, the manager 110 may react quickly to acquire capacity for a particular instance pool based on a dynamically changing overall system health assessment.

Figure 2:
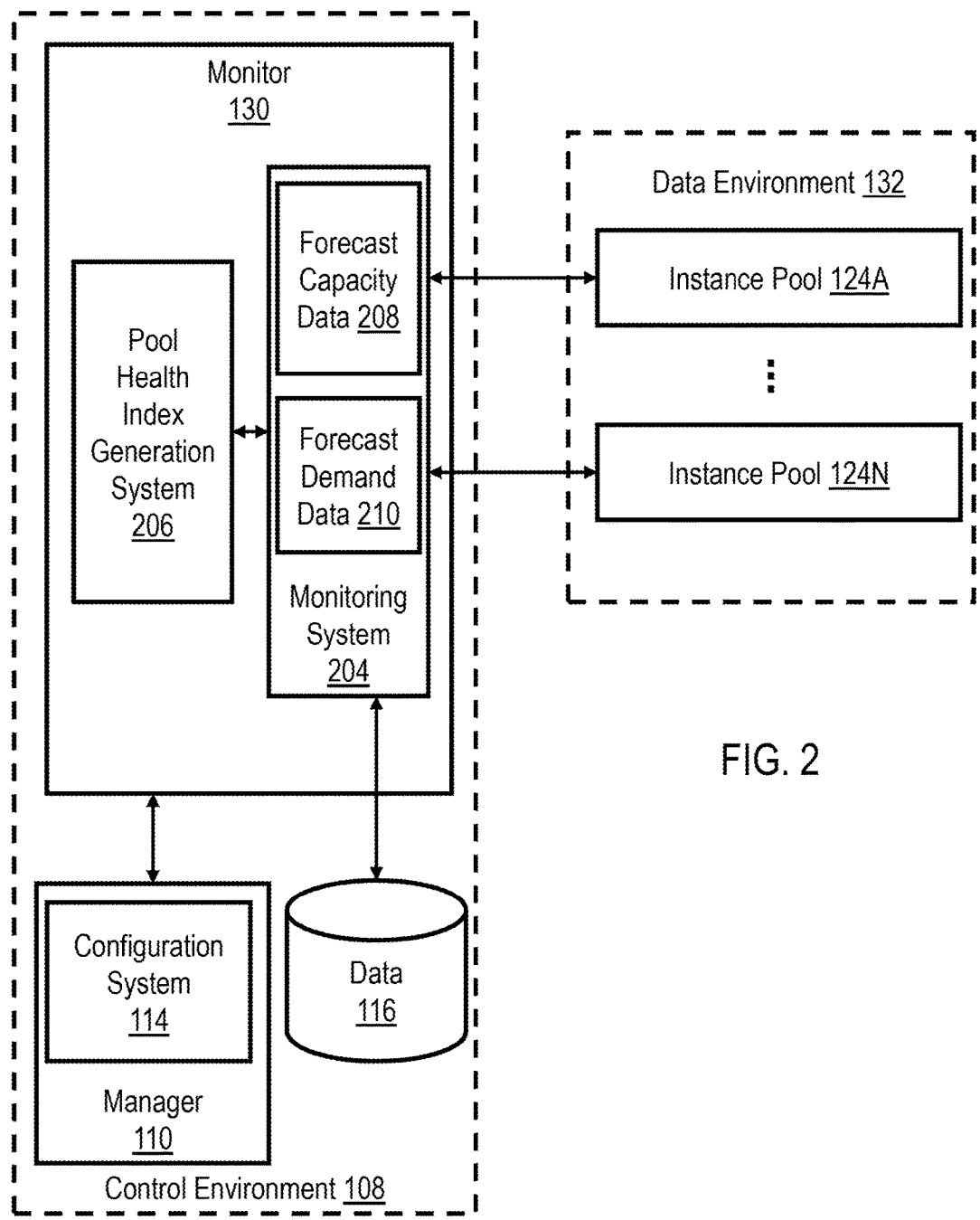
FIG. 2 shows a block diagram of an example interaction between a control environment of a distributed computing environment and a data environment of the distributed computing environment, in accordance with various embodiments.

FIG. 2 shows a block diagram of an example interaction between control environment 108 and data environment 132 in distributed computing environment 100, in accordance with various embodiments. As discussed previously, monitor 130, which may run in the control environment 108, may monitor instance pools 124A-N, that include instances running in data environment 132, utilizing monitoring system 204 to determine the current capacity of each of instance pools 124A-N. The monitoring system 204 may be hardware and/or software that monitors the instance pools 124A-N and generates the forecast capacity data 208 that indicates the current capacity plus any scheduled hardware additions and minus any hardware subtractions for each of instance pools 124A-N. For example, monitoring system 204 may determine that the current capacity of instance pool 124A includes 100 total slots to host instances and the current capacity of instance pool 124N includes 50 total slots to host instances. In order to make this determination, the hosts running on instance pools 124A-N may push data to monitoring system 204 indicating the number of slots that are available to host instances for each of the instance pools 124A-N, and/or the monitoring system 204 may pull data indicating the number of slots that are available to host instances from the hosts of instance pools 124A-N. For example, each host in instance pool 124A may push data indicating its number of slots available to host instances. Monitoring system 204 then may aggregate the data to determine the total number of slots available for instance pool 124A. Monitoring system 204 also may receive schedules of hardware additions and/or subtractions that may add and/or subtract hosts with available slots to host instances for each of instance pools 124A-N. These schedules may be pushed and/or pulled from manager 110. Monitoring system 208 may add slots scheduled for addition to the determined current capacity for each of the instance pools 124A-N and subtract the slots scheduled to be removed from the determined current capacity for each of the instance pools 124A-N to generate the forecast capacity data 208. For example, monitoring system 208 may determine that instance pool 124A has a current capacity of 100 total slots to run instances, and if a rack of servers, containing 10 servers with 100 slots total, is scheduled to be added to host instances in instance pool 124A and no servers are scheduled to be removed from hosting instances in instance pool 124A, then the monitoring system 204 may generate forecast capacity data 208 that identifies a forecast capacity of 200 total slots to run instances in instance pool 124A for a specified time in the future. The forecast capacity data 208 may be provided to pool health index generation system 206.

Monitoring system 204 may also generate forecast demand data 210. Forecast demand data 210 may include an estimate for how much hardware capacity is needed at a given time in a given instance pool. The monitoring system 204 may query the state reflective of launches and terminations stored in data store 116 to forecast future capacity requirements for a given instance pool based on historical data (e.g., the number of instances launched and running in a given instance pool in the past) and/or booked reservations (e.g., the number of instances customers have reserved for future use). For example, monitoring system 204 may query the data store 116 to determine the number of instances running in instance pool 124A currently or at some time in the past. The monitoring system 204 may also query manager 110 to determine the number of reserved instances for future use (i.e., instances that a customer as reserved for use in the future). The monitoring system 204 may then add the number of reserved instances to the number of instances currently running or running in the past to generate the forecast demand data 210. In other embodiments, other forecasting methods, as described above, may be utilized to generate the forecast demand data 210. The forecast demand data 210 may be provided to pool health index generation system 206.

Pool health index generation system 206 receives the forecast capacity data 208 and forecast demand data 210. Pool health index generation system 206 may be configured to generate the pool health index value for each of the instance pools 124A-N by comparing the forecast capacity data 208 with the forecast demand data 210 for each of the instance pools 124A-N and generate the pool health index values based on the comparison as discussed previously. For example, pool health index generation system 206 may determine that instance pool 124A is relatively healthy (i.e., more capacity is available than forecasted to be needed) and generate and/or assign an instance pool a relatively high pool health index value if the forecast capacity data 208 indicates that there will be more slots available to host instances for a future time than forecast demand data 210 indicates will be needed. However, pool health index generation system 206 may determine that instance pool 124A is relatively unhealthy (i.e., there is more demand for instances than capacity to host those instances) and generate and/or assign an instance pool a relatively low pool health index value if the forecast capacity data 208 indicates that there will be less slots available to host instances for a future time than forecast demand data 210 indicates will be needed.

The pool health index values for each of the instance pools 124A-N may be propagated to manager 110 from pool health index generation system 206. Manager 110 is configured to receive the pool health index values and determine how computing environment 100 should be configured based on the pool health index values. Configuration system 114, in the manager 110, is configured to receive the pool health index values and determine how computing environment 100 should be configured based on the pool health index values as discussed previously. In some embodiments, manager 110 may compare each of or some of the pool health index values to a threshold value. If one or more of the pool health index values is less than the threshold value, the manager 110 may generate an alert that indicates that an instance pool available to run in the computing environment 100 should be reconfigured and/or configured in a different manner. For example, if the pool health index value for instance pool 124A is less than a threshold value, manager 110 may generate an alert that indicates that an instance pool available to run in the computing environment 100 should be reconfigured and/or configured in a different manner. For example, if the pool health index value for instance pool 124A is less than a threshold value, manager 110 may generate an alert that indicates that the computing environment 100 should be configured to improve the pool health index value for instance pool 124A. In some embodiments, the manager 110, through configuration system 114 may automatically configure the computing environment 100 if any of the pool health index values is less than the threshold value as discussed above.

Figure 3:
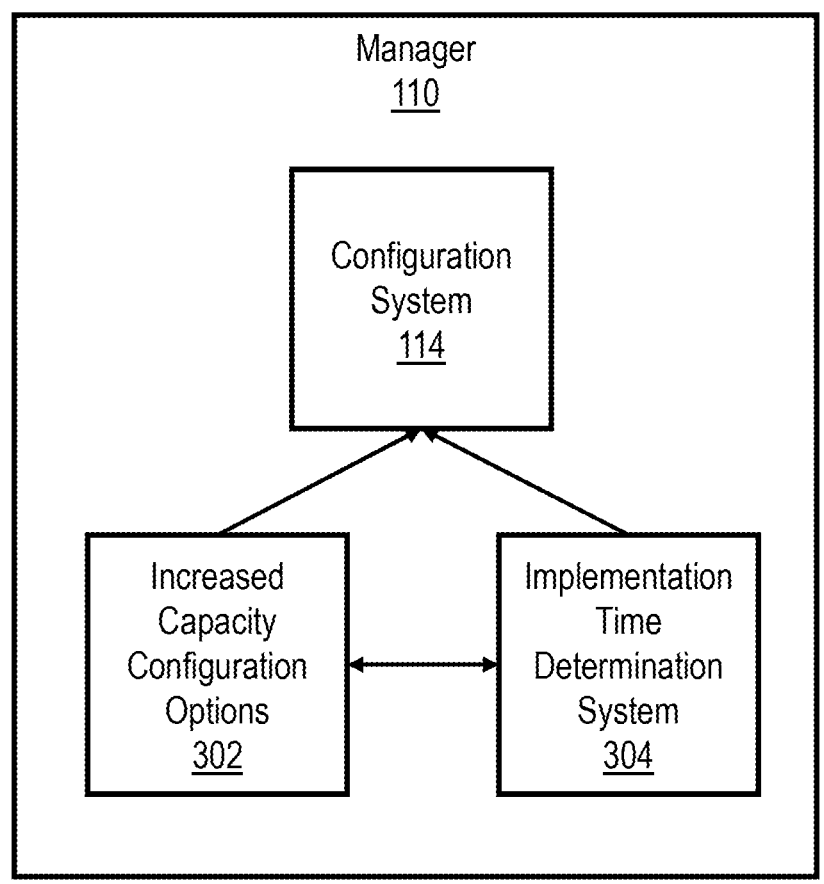
FIG. 3 shows a block diagram of an example manager of a control environment in a distributed computing environment, in accordance with various embodiments.

FIG. 3 shows a block diagram of an example manager 110 of control environment 108 in distributed computing environment 100, in accordance with various embodiments. As discussed previously, manager 110 may include configuration system 114 and increased capacity configuration options 302. The increased capacity configuration options are received by configuration system 114. In some embodiments, the increased capacity configuration options 302 are preprogrammed into manager 110 and list hardware configuration options to increase the capacity for a given instance pool (i.e., to open up additional slots to run instances in a given instance pool). For example, the increased capacity configuration options 302 for instance pool 124A may include reconfiguring host 148A to host instances of the same type as instances 126A-N, launching additional hardware to host instances in instance pool 124A (e.g., adding servers configured to host instances of the same type as instances running in instance pool 124A), evicting spot instances from instance pool 124A, evicting fraudulently initiated instances from the instance pool 124A, doing nothing, etc. In some embodiments, the list of increased capacity configuration options may be generated by manager 110 based on current and past hardware configurations within data interface 132. For example, manager 110 may determine that host 144A and host 148A are from the same hardware family, thus may be amenable to being reconfigured.

Additionally, manger 110 may also include implementation time determination system 304. The implementation time determination system 304 may be configured to determine the length and/or amount of time an increased capacity configuration option from the increased capacity configuration options 302 will take to implement. For example, implementation time determination system 304 may determine that reconfiguring host 148A to host instances of the same type as instances 126A-N will take 10 hours. The implementation time, determined by the implementation time determination system 304, is received by the configuration system 114. Configuration system 114 may generate the assessment value for each of the increased capacity configuration options 302 based on the corresponding implementation time received from the implementation time determination system 304. For example, configuration system 114 may generate a higher assessment value (indicating that the overall system health will not increase and/or will decrease) for an increased capacity configuration option with a longer implementation time.

Figure 4:
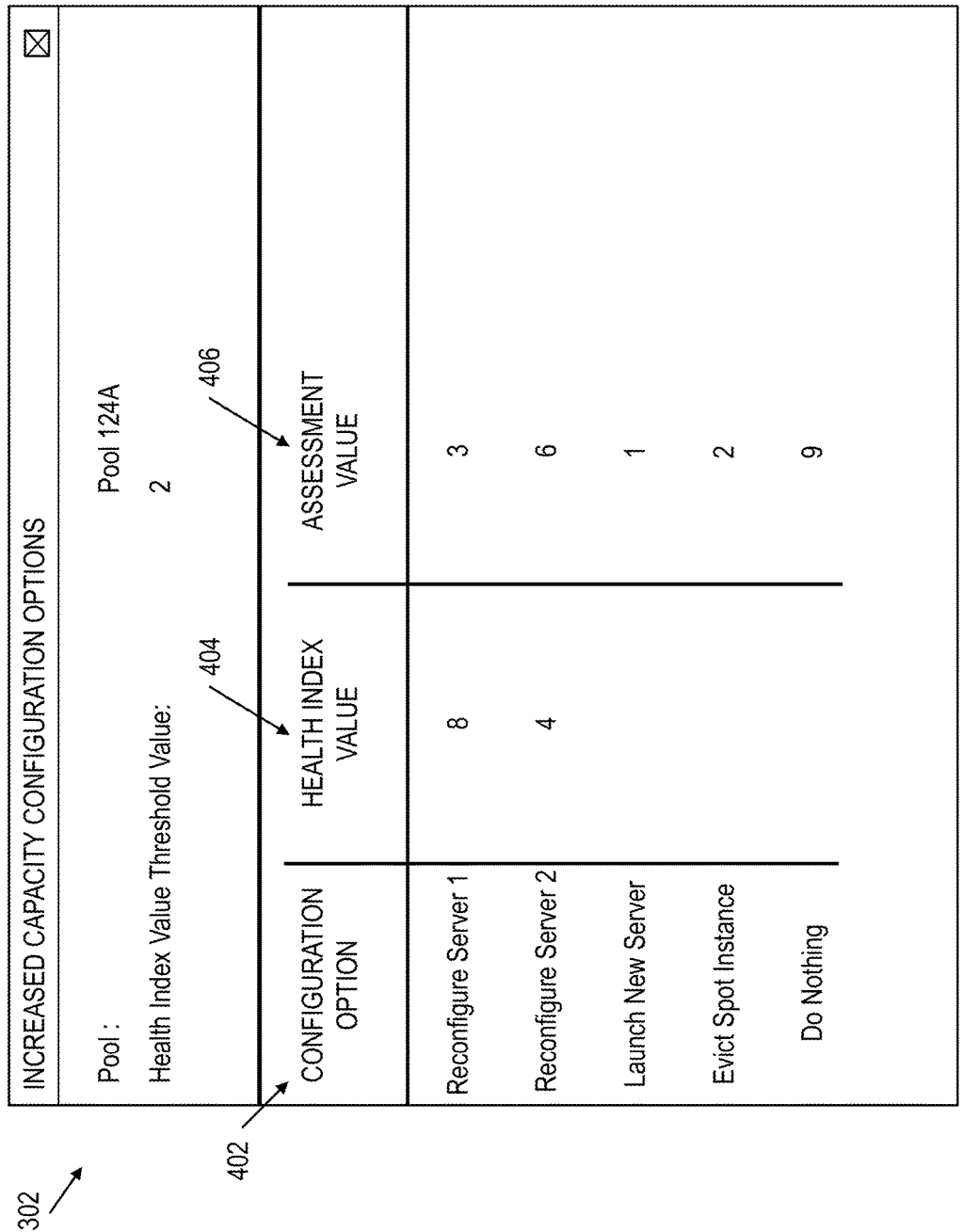
FIG. 4 shows an example of increased capacity configuration options that may be utilized to acquire capacity for a pool of virtual machine instances in a distributed computing environment, in accordance with various embodiments.

FIG. 4 shows an example of increased capacity configuration options 302 that may be utilized to acquire capacity for a pool of virtual machine instances, such as instances 126A-N, 156A-N, 128A-N, and/or 158A-N, in distributed computing environment 100, in accordance with various embodiments. In this example, the increased capacity configuration options 302 includes the instance pool 124A for which the options are presented as well as the health index value threshold value at which the greatest health increase configuration option is implemented. Thus, in this example, once the health index value drops below and/or is less than 2, the greatest health increase configuration option is implemented.

In column 402, the configuration options are presented. In this example, five configuration options for increasing capacity in instance pool 124A are presented including: reconfiguring host server 1, reconfiguring host server 2, launching a new server host, evicting spot instances running in instance pool 124A, and doing nothing. In column 404, the health index value of the instance pools that include instances running on the host servers 1 and 2 are presented. Here the instance pool that includes instances running on host server 1 has a relatively high health index value of 8 while the instance pool running on host server 2 has a relatively average health index value of 4. In column 406, the assessment values for each of the configuration options presented in column 402 are presented. Thus, in this example, reconfiguring host server 1 has a relatively low assessment value of 3 (relatively high overall health increase of the system); reconfiguring host server 2 has an relatively average assessment value of 6 (medium assessment value); launching a new server has a very low assessment value of 1 (relatively very high overall health increase of the system); evicting spot instances has a relatively low assessment value of 2 (relatively high overall health increase of the system); and doing nothing has a relatively high assessment value of 9 (relatively low overall health increase of the system).

Thus, in this example, if the pool health index value of instance pool 124A drops below and/or is less than 2, then the configuration system 114 will implement launching a new server (i.e., host) to host instances in instance pool 124A as the greatest health increase configuration option. If launching a new server does not create enough capacity to raise the health index value threshold to 2 or higher, then the configuration system 114 will evict spot instances from instance pool 124A as the second greatest health increase configuration option.

Figure 5:
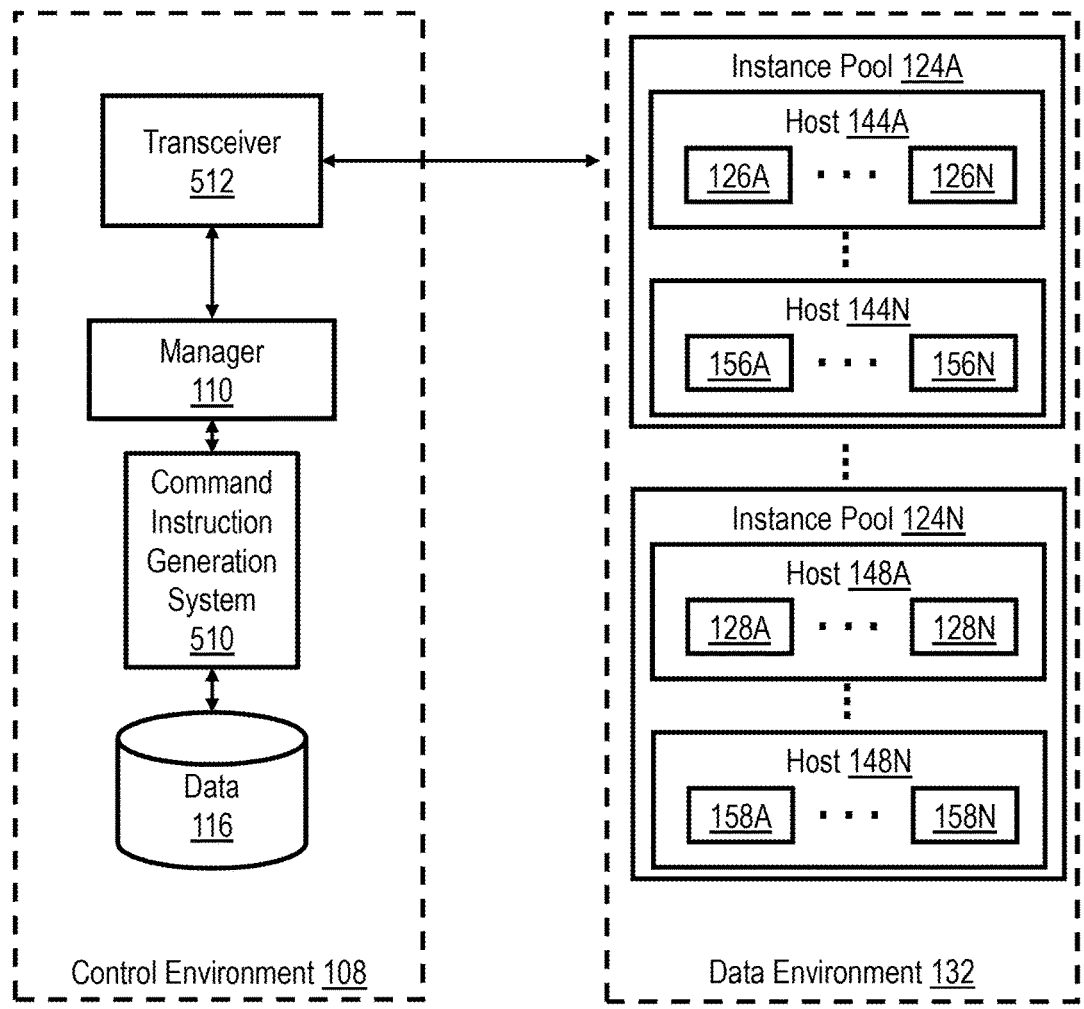
FIG. 5 shows a block diagram of an example interaction between devices of a control environment of a distributed computing environment and virtual machine instances of a data environment of the distributed computing environment, in accordance with various embodiments.

FIG. 5 shows a block diagram of an example interaction between devices of control environment 108 of distributed computing environment 100 and hosts 144A-N and 148A-N of data environment 132 of the distributed computing environment 100, in accordance with various embodiments. As noted previously, control environment 108 may include manager 110 and data store 116. Additionally, control environment 108 may include command instruction generation system 510 and transceiver 512. Command instruction generation system 510 may be hardware and/or software that generates a command instruction that instructs a host running in the data environment 132 (e.g., hosts 144A-N and 148A-N) to launch and/or terminate one or more instances, such as instances 126A-N, 156A-N, 128A-N, and/or 158A-N and/or to implement an increased capacity configuration option (e.g., reconfigure a host to host a different type of instance). For example, after the manager 110 determines that the greatest health increase configuration option is to be implemented, manager 110 causes command instruction generation system 510 to generate a command instruction that instructs a host to implement the greatest health increase configuration option (e.g., reconfigure to host a different type of instance or evict spot instances running on the host). Transceiver 512 then may transmit the command instruction to the data environment 132 which may implement the command instruction by, for example, reconfiguring host 148A to host instances as the same type as instances 126A-N or evicting spot instances running on host 144A. Transceiver 512 may be a medium attachment unit (MAU), a gigabit interface converter (GBIC), a small form-factor pluggable (SFP), an enhanced small form-factor pluggable (SFP+), a ten gigabit small form factor pluggable (XFP), a ten attachment unit interface (XAUI), a c form-factor pluggable (CFP), and/or any other device that is capable of transmitting and receiving data communications.

Figure 6:
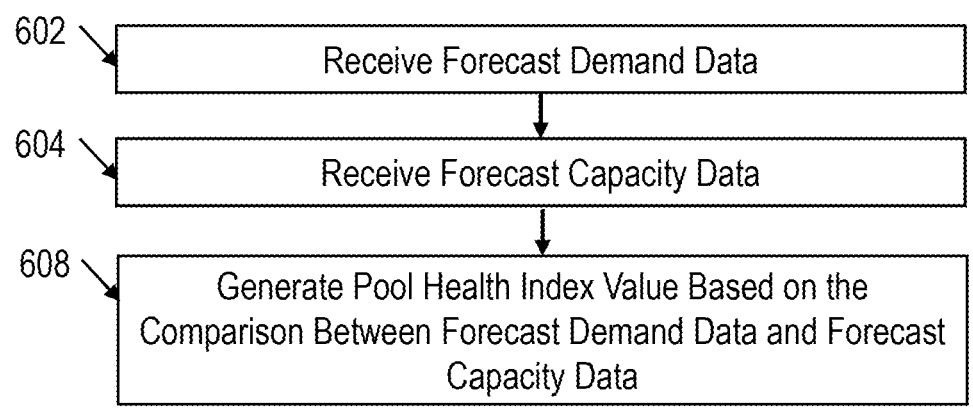
FIG. 6 shows a flow diagram illustrating aspects of operations that may be performed to determine a health index value in a distributed computing environment, in accordance with various embodiments.

FIG. 6 shows a flow diagram illustrating aspects of operations that may be performed to determine a health index value in a distributed computing environment, in accordance with various embodiments. Though depicted sequentially as a matter of convenience, at least some of the actions shown can be performed in a different order and/or performed in parallel. Additionally, some embodiments may perform only some of the actions shown. As shown in element 602, forecast demand data is received. The forecast demand data, such as forecast demand data 210, may be received by a monitoring system, such as monitoring system 204, and/or generated by the monitoring system 204. For example, manager 110 may initiate a command instruction to launch an instance, as described above, and store state reflective of the launch in data store 116. Similarly, manager 110 may terminate an instance by initiating a command instruction to terminate the instance and store state reflective of the termination in data store 116. Monitoring system 204 may query the state reflective of launches and terminations stored in data store 116. Utilizing this historical data (e.g., the number of instances launched and running in a given instance pool in the past) and/or booked reservations (e.g., the number of instances customers have reserved for future use), monitoring system 204 may generate the forecast demand data. In an example, the forecast demand data may be based on the average, median, highest, and/or lowest number of instances running in the instance pool for a Wednesday at 01:00 a.m. over the past year to provide a forecast of demand for a future Wednesday at 01:00 a.m. adding any additional instances that customers have reserved for future use. The forecast demand data may be generated for any point of time in the future. Thus, the forecast demand data may estimate how much capacity is needed at a given time in a given instance pool, such as instance pool 124A. For example, the forecast demand data may indicate that in 1 hour, 90 slots are needed to run 90 instances in instance pool 124A.

In element 604, forecast capacity data is received. The forecast capacity data, such as forecast capacity data 208, may be generated by the monitoring system, such as monitoring system 204, by monitoring one or more instance pools. The forecast capacity data provides a forecast of actual hardware capacity to host instances in an instance pool at a time in the future. For example, monitoring system 204 may determine that the current capacity of instance pool 124A includes 100 total slots to host instances and the current capacity of instance pool 124N includes 50 total slots to host instances. In order to make this determination, the hosts running on instance pools 124A-N may push data to monitoring system 204 indicating the number of slots that are available to host instances for each of the instance pools 124A-N, and/or the monitoring system 204 may pull data indicating the number of slots that are available to host instances from the hosts of instance pools 124A-N. Monitoring system 204 then may aggregate the data received from the hosts to determine the total number of slots available for a given instance pool. Monitoring system 204 also may receive schedules of hardware additions and/or subtractions that may add and/or subtract hosts with available slots to host instances for each of instance pools 124A-N. These schedules may be pushed and/or pulled from manager 110. Monitoring system 208 may add slots scheduled for addition to the determined current capacity for each of the instance pools 124A-N and subtract the slots scheduled to be removed from the determined current capacity for each of the instance pools 124A-N to generate the forecast capacity data 208. The forecast capacity data then may be transmitted to the pool health index generation system.

In element 606, a pool health index value is generated for each instance type or instance pool based on a comparison between the forecast demand data with the forecast capacity data. In some embodiments this includes computing the absolute difference (i.e., an integer) of forecasted demand and forecasted capacity at various points of time in the future (e.g., one week, one month, etc.) As such, if the value grows for a point of time in the future, it means the availability of instances of the instance type at the future time is drifting from a number that is expected to satisfy customer demand. In example embodiments, the pool health index generation system can be programmed with software to perform the above calculation for each instance type or instance pool offered by the service provider at various points of time in the future.

Figure 7:
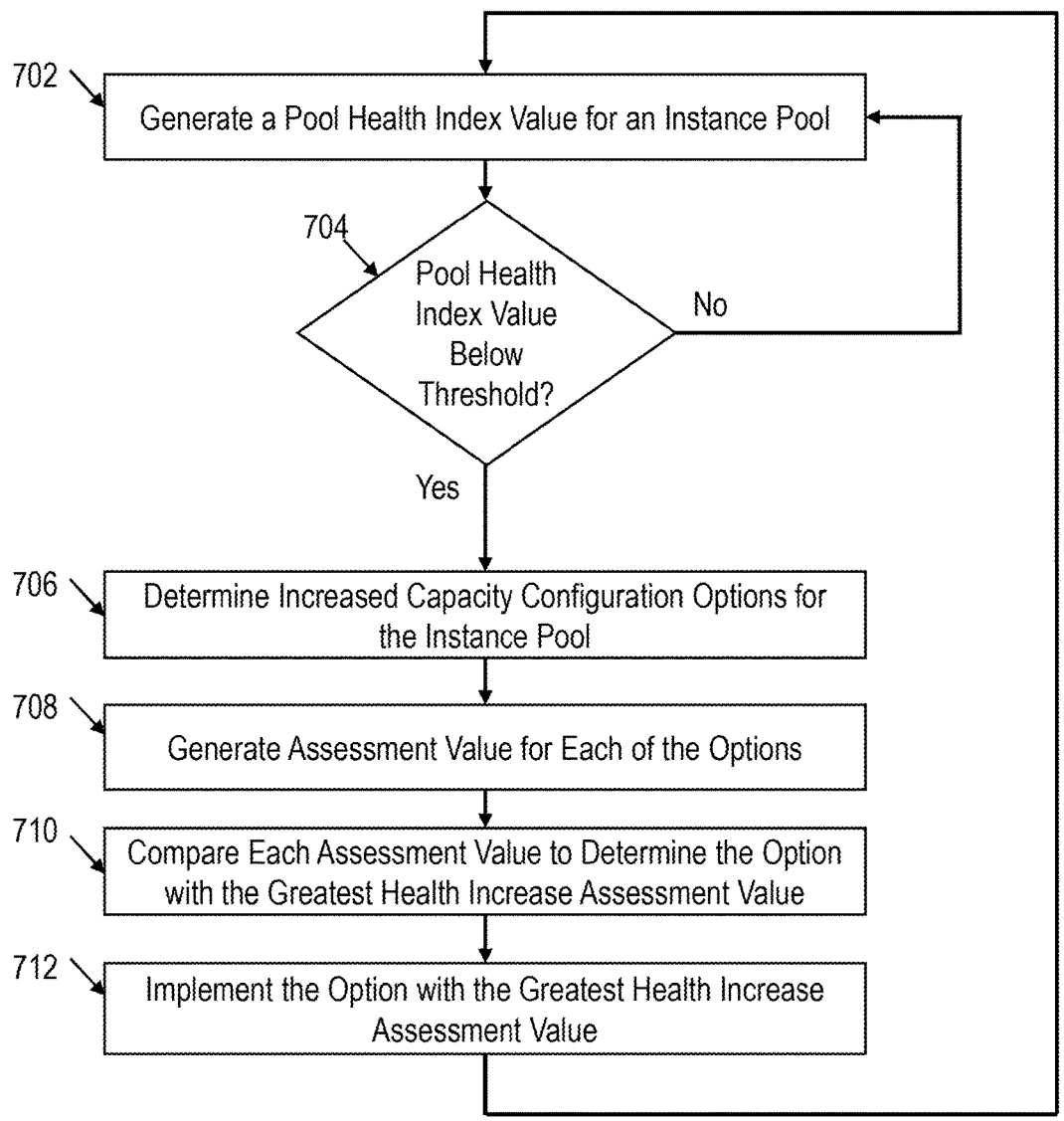
FIG. 7 shows a flow diagram illustrating aspects of operations that may be performed to configure hardware to acquire additional capacity for a pool of virtual machine instances in a distributed computing environment, in accordance with various embodiments.

FIG. 7 shows a flow diagram illustrating aspects of operations that may be performed to configure hardware to acquire additional capacity for a pool of virtual machine instances in a distributed computing environment, in accordance with various embodiments. Though depicted sequentially as a matter of convenience, at least some of the actions shown can be performed in a different order and/or performed in parallel. Additionally, some embodiments may perform only some of the actions shown. As shown in element 702, a pool health index value is generated for a particular instance pool. For example, pool health index generation system, such as pool health generation system 206, may generate the pool health index value based on a comparison between forecast demand data for instance pool 124A and forecast capacity data from instance pool 124A as discussed above.

In element 704, a determination is made as to whether the pool health index value is below and/or less than a threshold value. If, in element 704, a determination is made that the pool health index value is not below and/or less than a threshold value, then the method continues in element 702 with generating a new pool health index value. Thus, the pool health index value may be updated based on the conditions in the pool of instances that is the subject of the pool health index value. However, if, in element 704, a determination is made that the pool health index value is below and/or less than a threshold value, then the method continues in element 706 with determining the increased capacity configuration options for the instance pool. For example, increased capacity configuration options 302 for instance pool 124A may be determined (i.e., generated and/or received) by configuration system 114.

In element 708, an overall system health assessment value is generated for each of the options listed in the increased capacity configuration options. For example, configuration system 114 may generate an assessment value for each of the increased capacity configuration options. The assessment value generated may be based on the amount of time required to implement a particular option, the health index value of the particular option (e.g., if the option is reconfiguring host 148A to host instances of the same type as instances 126A-N, the health index value of the instance pool 124N), the profit that may be made on an instance (e.g., if the spot instance price is very high, evicting a spot instance may reduce profit), other business requirements (e.g., if additional hardware hosts may be launched but are scheduled to be retired, the business is effected if these additional hardware hosts are launched), the health index value of the instance pool for which capacity may be added (e.g., the lower the health index value the lower the overall system health if nothing is done, while the higher the health index value the higher the overall system health even if nothing is done), etc. The assessment value may be any number and/or indication of the overall health of the system assuming that a capacity configuration option is implemented. For example, the assessment value may be a range of numbers from 1-10 with 1 indicating that the health for the overall system in implementing the configuration option would increase a large amount and 10 indicating that the health of the overall system if the configuration option is implemented would not increase very much and/or decrease. While in this example, an assessment value of 1 indicates a large increase in health to the overall system, in other examples, a high number, such as 10, may indicate a large increase in health to the overall system if the configuration option is implemented while a low number, such as 1, may indicate a small increase and/or decrease in overall health to the system if the configuration option is implemented. In another example, the assessment value may be a band of overall system health if a configuration option is implemented, such as low, medium, and high.

In element 710, each of the assessment values generated are compared to determine a greatest health increase configuration option. For example, the configuration system 114 may compare each of the assessment values that were generated and determine a greatest health increase configuration option. Thus, if the list of increased capacity configuration options includes five options (e.g., reconfiguring host 148A, reconfiguring another host, launching a new host, evicting a spot instance, and doing nothing), then the configuration system 114 compares the assessment values generated for each of the five options and determines the option with the lowest assessment value (assuming that the assessment values are designed such that the higher the overall health of the system if a configuration option is implemented, the lower the assessment value generated). In element 712, the greatest health increase configuration option is implemented. For example, the configuration system 114 may implement the greatest health increase configuration option (i.e., the increased capacity configuration option with the lowest assessment value), thus generating additional capacity for instance pool 124A.

Figure 8:
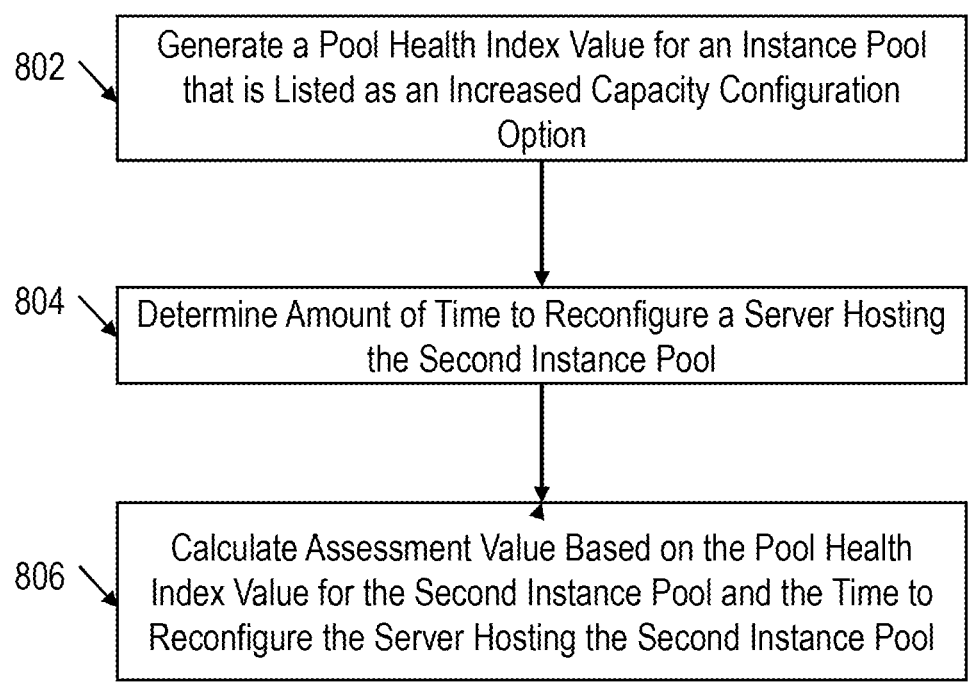
FIG. 8 shows a flow diagram illustrating aspects of operations that may be performed to generate an assessment value for configuring hardware to acquire additional capacity for a pool of virtual machine instances in a distributed computing environment, in accordance with various embodiments.

FIG. 8 shows a flow diagram illustrating aspects of operations that may be performed to generate an assessment value for configuring hardware to acquire additional capacity for a pool of virtual machine instances in a distributed computing environment, in accordance with various embodiments. Though depicted sequentially as a matter of convenience, at least some of the actions shown can be performed in a different order and/or performed in parallel. Additionally, some embodiments may perform only some of the actions shown. As shown in element 802, a pool health index value is generated for an instance pool that is listed as an increased capacity configuration option for another instance pool. For example, if reconfiguring host 148A that is running instances in instance pool 124N is listed as an increased capacity configuration option for increasing capacity of instance pool 124A, then a pool health index value is generated for instance pool 124N. Pool health index generation system, such as pool health generation system 206, may generate the pool health index value based on a comparison between forecast demand data for instance pool 124N and forecast capacity data from instance pool 124N as discussed above.

In element 804, the amount and/or length of time to reconfigure a server hosting the instance pool is determined. For example, implementation time determination system 304 may determine the length and/or amount of time it will take to reconfigure host 148A to host instances of the same type as instances 126A-N. In element 806, the assessment value for reconfiguring the server listed as an increased capacity configuration option is calculated based on the time to reconfigure the server and the health index value for the instance pool that is listed as an increased capacity configuration option for another instance pool. For example, the assessment value for reconfiguring host 148A is based on the implementation time for reconfiguring host 148A and the health index value of the instance pool 124N.

Figure 9:
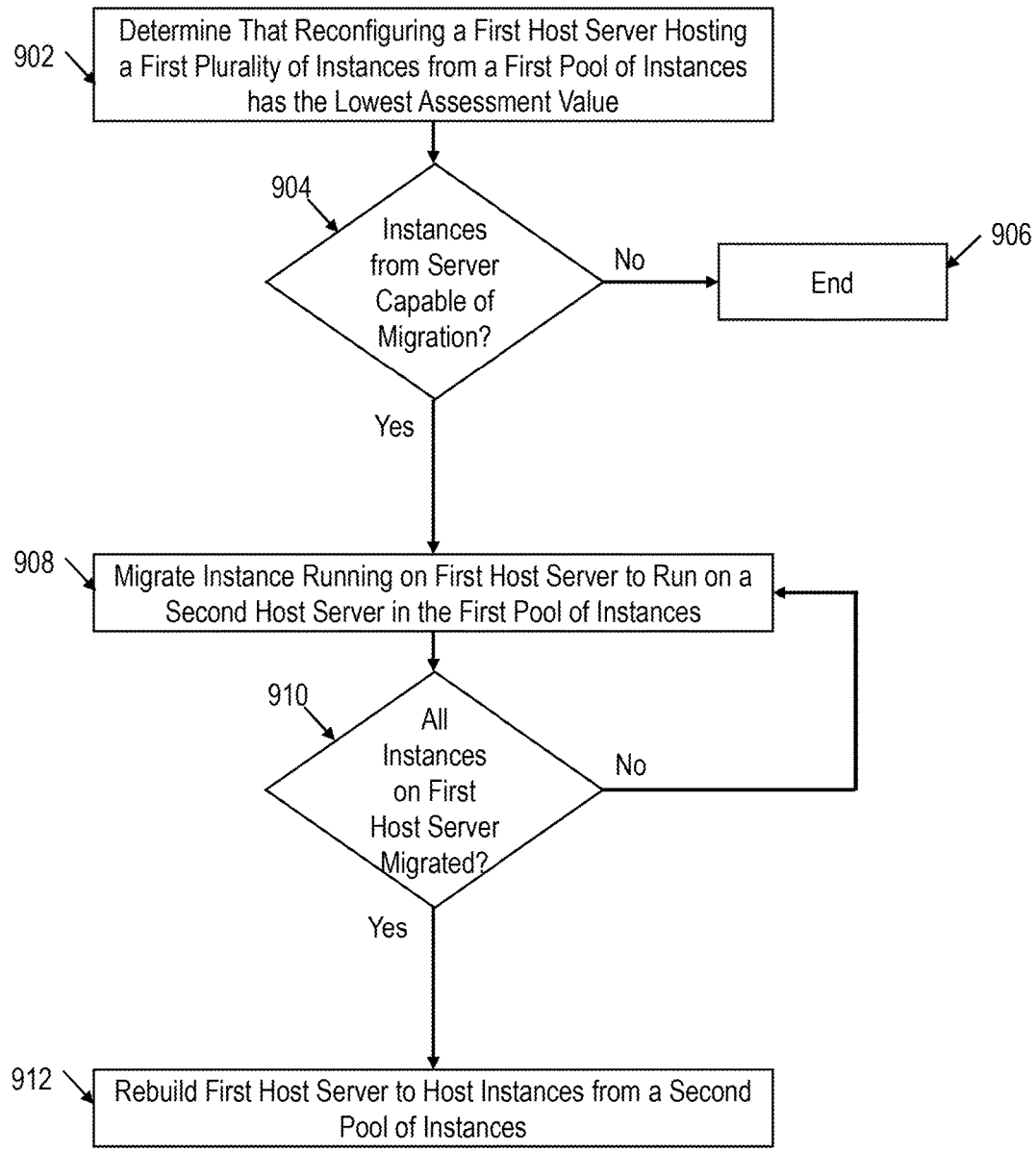
FIG. 9 shows a flow diagram illustrating aspects of operations that may be performed to reconfigure a host server to acquire additional capacity for a pool of virtual machine instances in a distributed computing environment, in accordance with various embodiments.

FIG. 9 shows a flow diagram illustrating aspects of operations that may be performed to reconfigure a host server to acquire additional capacity for a pool of virtual machine instances in a distributed computing environment, in accordance with various embodiments. Though depicted sequentially as a matter of convenience, at least some of the actions shown can be performed in a different order and/or performed in parallel. Additionally, some embodiments may perform only some of the actions shown. As shown in element 902, a determination is made that reconfiguring a first host server that is hosting instances running in a first pool of instances is the greatest health increase configuration option. For example, configuration system 114 may determine that reconfiguring host 148A, hosting instances 128A-128N in instance pool 124N, is the greatest health increase configuration option after comparing the assessment values for a list of increased capacity configuration options.

In element 904, a determination is made as to whether the instances from the first host server are capable of migration. For example, configuration system 114 may determine whether host 148A is capable of migrating instances running on host 148A, such as instances 128A-N to another host server, such as host 148N, so that the instances 128A-N run on the other host server. If, in element 904, a determination is made that the first host server is not capable of migration, the method ends in element 906. However, if, in element 904, a determination is made that the first host server is capable of migration, the method continues in element 908 with migrating an instance running on the first host server to a second host server. For example, instance 128A, running on host 148A may be migrated to host 148N, so that instance 128A runs on host 148N.

In element 910, a determination is made as to whether all the instances running on the first host server have been migrated. If, in element 910, a determination is made that all of the instances running on the first host server have not been migrated, the method continues in element 908 with migrating another instance, such as instance 128N, from the first host server to the second host server. However, if, in element 910, a determination is made that all of the instances running on the first host server have been migrated, the method continues in element 912 with rebuilding and/or reconfiguring the first host server to host instances from a second pool of instances. For example, once all of the instances 128A-N running on host 148A have migrated to host 148N, host 148A may be rebuilt and/or reconfigured to run instances from instance pool 124A, such as instances of the same type as instances 126A-N. In some embodiments, the rebuilding a host to support a different instance type may include determining that the host that is being reconfigured includes the necessary hardware in the server (e.g., certain CPU models) to support the instance type associated with the new pool, that the host has enough memory to support the new instance type associated with the new pool, that the host has enough network capacity to support the new instance type, etc.

Figure 10:
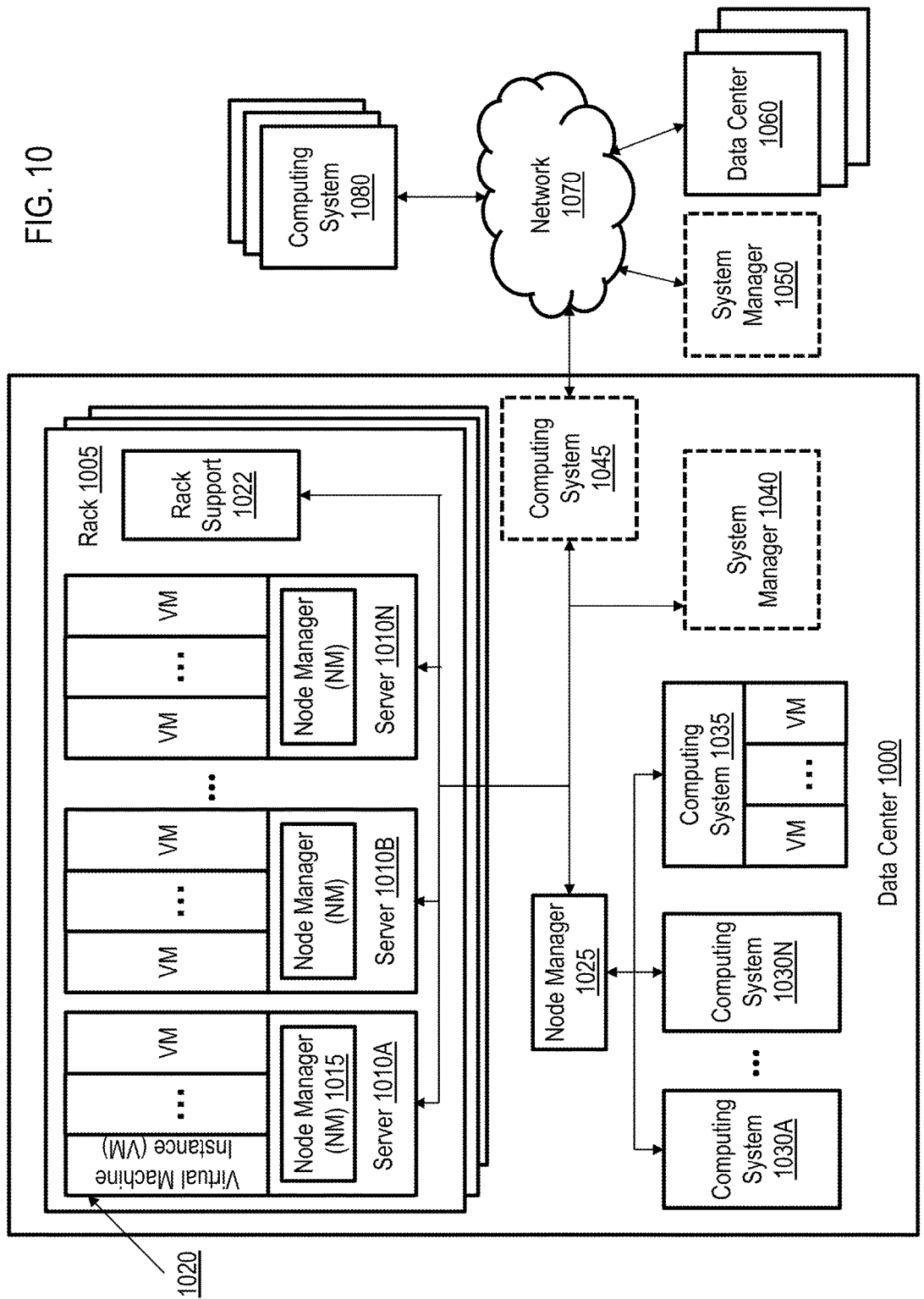
FIG. 10 shows a block diagram of a distributed computing environment, in accordance with various embodiments.

In at least some embodiments, a portion or all of one or more of the technologies described herein, including the techniques to implement the control interface, data interface, and/or virtual machine instances, may be implemented in a distributed computing environment, such as shown in FIG. 10. In particular, in this example, a program execution service manages the execution of programs on various computing systems located within a data center 1000. Data center 1000 includes a number of racks 1005, and each rack includes a number of computing systems 1010A-N, as well as a rack support computing system 1022 in this example embodiment. The computing systems 1010 each host one or more virtual machine instances 1120 in this example, as well as a distinct node manager 1015 to manage the virtual machines. In this example, each virtual machine 1020 may be employed to provide an independent computing environment for executing an instance of a program. In this example, the rack support computing system 1022 may provide various utility services for other computing systems local to the rack, as well as possibly to other computing systems located in the data center 1000. The utility services may include, for example, data and/or program storage for other computing systems, execution of one or more machine manager modules to support other computing systems, etc. Each computing system 1010 may alternatively have a distinct machine manager module (e.g., provided as part of the node manager for the computing system) and/or have local storage (not shown) to store local copies of programs. The computing systems 1010 and the rack support computing system 1022 all share a common data exchange medium in this example, and may all be part of a single group. This common data exchange medium may be connected to one or more external data exchange mediums shared by, for example, other racks or computing systems in the data center 1000.

In addition, the example data center 1000 further includes additional computing systems 1030A-N and 1035 that share a common data exchange medium with a node manager 1025, and node manager 1025 manages computing systems 1030 and 1035. In the illustrated example, computing system 1035 also hosts a number of virtual machines as execution environments for use in executing program instances for one or more users, while computing systems 1030 do not host distinct virtual machines. In this example, an optional computing system 1045 resides at the interconnect between the data center 1000 and an external network 1070. The optional computing system 1045 may provide a number of services such as acting as a network proxy, managing incoming and/or outgoing data transmissions, etc. Additionally, an optional system manager computing system 1040 is also illustrated. The optional system manager computing system 1040 may assist in managing the execution of programs on other computing systems located within the data center 1000 (or optionally on computing systems located in one or more other data centers 1060). The optional system manager computing system 1040 may execute a system manager module. A system manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc.

In this example, the data center 1000 is connected to a number of other systems via a network 1070 (e.g., the Internet), including additional computing systems 1080 that may be operated by the operator of the data center 1000 or third parties such as clients, additional data centers 1060 that also may be operated by the operator of the data center 1000 or third parties, and an optional system manager 1050. In a manner similar to system manager 1040, the system manager 1050 may manage the execution of programs on computing systems located in one or more data centers 1000 and/or 1060, in addition to providing a variety of other services. Although the example system manager 1050 is depicted as external to any particular data center, in other embodiments it may be located within a data center, such as one of the data centers 1060.

In at least some embodiments, a server that implements a portion or all of one or more of the technologies described herein, including the techniques to implement the control interface, data interface, and/or resources, may include a general-purpose computer system that includes or is configured to access one or more computer-accessible media. FIG.

11 shows such a general-purpose computing device 1100. In the illustrated embodiment, computing device 1100 includes one or more processors 1110 coupled to a system memory 1120 via an input/output (I/O) interface 1130. Computing device 1100 further includes a network interface 1140 coupled to I/O interface 1130.

In various embodiments, computing device 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA. In some implementations, graphics processing units (GPUs) may be used instead of, or in addition to, conventional processors. In some embodiments, web services layer 112, manager 110, monitor 130, and/or virtual machine instances 126A-N and 128 A-N are implemented by processors 1110.

System memory 1120 may be configured to store instructions and data accessible by processor(s) 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1120 as code 1125 and data 1126

In one embodiment, I/O interface 1130 may be configured to coordinate I/O traffic between processor 1110, system memory 1120, and any peripheral devices in the device, including network interface 1140 or other peripheral interfaces such as various types of persistent and/or volatile storage devices used to store physical replicas of data object partitions. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computing device 1100 and other devices 1160 attached to a network or networks 1150, such as other computer systems or devices as illustrated in FIG. 1 through FIG. 10, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks such as Fibre Channel SANs, or via any other suitable type of network and/or protocol.

Figure 11:
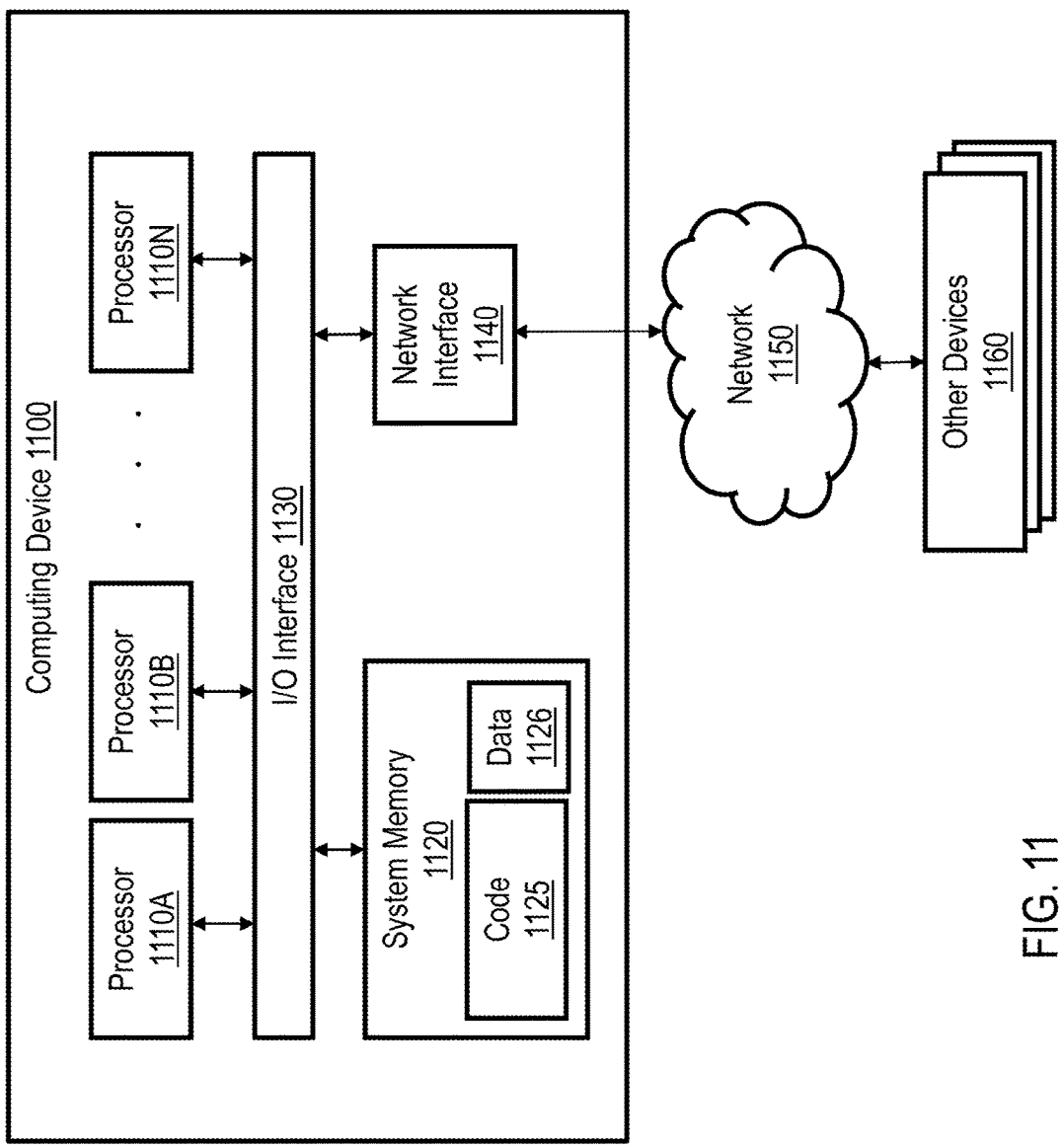
FIG. 11 shows a block diagram illustrating an example computing device, in accordance with various embodiments.

In some embodiments, system memory 1120 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1100 via I/O interface 1130. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Certain terms are used throughout the preceding description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
generating, in a data interface of a distributed computing system, a first pool health index value for a first pool of servers based on a comparison of forecast demand data that estimates a number of virtual machine instances needed at a future time in the first pool of servers configured to host virtual machine instances with forecast capacity data that includes an indication of a number of slots estimated to be available to run virtual machine instances in the first pool of servers at the future time;
determining, in a control interface of the distributed computing system, a plurality of increased capacity configuration options for the first pool of servers;
generating an overall system health assessment value for each of the plurality of increased capacity configuration options;
comparing each of the assessment values to determine a configuration option of the plurality of increased capacity configuration options having a greatest health increase assessment value; and
in response to the first pool health index value being less than a threshold value implementing the determined configuration option, wherein implementing the determined configuration option comprises:
reconfiguring a server that is configured to host a first virtual machine instance type in a second pool of servers to host a second virtual machine instance type in the first pool of servers;
launching available hardware to host a virtual machine instance of the second virtual machine instance type in the first pool of servers; or
evicting a virtual machine instance running on a server in the first pool of servers.

2. The method of claim 1, further comprising:
in response to implementing the configuration option, generating, by the pool health generation system, a second pool health index value for the first pool of servers based on a comparison of forecast demand data for the first pool of servers with forecast capacity data for the first pool of servers;
determining a second configuration option of the plurality of increased configuration options having a second greatest health increase assessment value; and
in response to the second pool health index value being less than the threshold value, implementing the second configuration option.

3. The method of claim 1, wherein the generating the assessment value comprises:
generating a pool health index value for the second pool of servers;
determining an amount of time to reconfigure a server that is hosting a first virtual machine instance in the second pool of servers; and
calculating the assessment value based on the pool health index value for the second pool of servers and the amount of time to reconfigure the server that is hosting the first virtual machine instance in the second pool of servers.

4. A system, comprising:
one or more computer systems including one or more processors; and
memory including instructions, that upon being executed by the one or more processors, cause the system to:
generate a first pool health index value for a first pool of servers based on a comparison of forecast demand data that estimates a number of virtual machine instances needed at a future time in the first pool of servers configured to host virtual machine instances with forecast capacity data that includes an indication of a number of slots estimated to be available to run virtual machine instances in the first pool of servers at the future time;
determine a plurality of increased capacity configuration options for the first pool of servers;
generate an assessment value for each of the plurality of increased capacity configuration options; and
implement a first configuration option of the plurality of increased capacity configuration options having a greatest health increase assessment value in response to the first pool health index value being less than a threshold value, wherein implementing the first configuration option comprises:
reconfiguring a first server that is configured to host a first virtual machine instance type in a second pool of servers to host a second virtual machine instance type in the first pool of servers;
launching available hardware to host a virtual machine instance of the second virtual machine instance type in the first pool of servers; or
evicting a virtual machine instance running in the first pool of servers.

5. The system of claim 4, wherein the instructions, upon being executed, further cause the system to:
generate a second pool health index value for the first pool of servers; and
implement a second configuration option of the plurality of increased capacity configuration options having a second greatest health increase assessment value.

6. The system of claim 5, wherein the second pool health index value is generated in response to the first configuration option being implemented.

7. The system of claim 4, wherein the instructions, upon being executed, further cause the system to compare each of the assessment values to determine the first configuration option.

8. The system of claim 4, wherein the instructions, upon being executed, further cause the system to generate the assessment value by:
generating a pool health index value for the second pool of servers;
determining an amount of time to reconfigure the first server; and
calculating the assessment value based on the pool health index value for the second pool of servers and the amount of time to reconfigure the first server.

9. The system of claim 4, wherein reconfiguring the first server comprises migrating a virtual machine instance executing on the first server to a second server in the second pool of servers and configuring the first server to host the second virtual machine instance type in the first pool of servers.

10. A method, comprising:
generating a first pool health index value for a first pool of servers based on a comparison of forecast demand data that estimates a number of virtual machine instances needed at a future time in the first pool of servers configured to host virtual machine instances with forecast capacity data that includes an indication of a number of slots estimated to be available to run virtual machine instances in the first pool of servers at the future time;

determining a plurality of increased capacity configuration options that includes reconfiguring a first server that is configured to host a first virtual machine instance type in a second pool of servers to host a second virtual machine instance type in the first pool of servers and that includes launching available hardware to host a virtual machine instance of the second virtual machine instance type in the first pool of servers;

generating an assessment value for each of the plurality of increased capacity configuration options; and implementing a configuration option of the plurality of increased capacity configuration options in response to the first pool health index value being less than a threshold value, the configuration option having a greatest health increase assessment value of the plurality of increased capacity configuration options.

11. The method of claim of claim 10, further comprising:
generating a second pool health index value for the first pool of servers; and implementing a second configuration option of the plurality of increased capacity configuration options, the second configuration option having a second greatest health increase assessment value of the plurality of increased capacity configuration options.

12. The method of claim 11, wherein the generating the second pool health index value is in response to the one configuration option being implemented.

13. The method of claim 10, further comprising, comparing each of the assessment values to determine the one configuration option.

* * * * *